United States Patent
Triolo et al.

[11] Patent Number: 5,880,165
[45] Date of Patent: Mar. 9, 1999

[54] MODIFIED REBOND POLYURETHANE FOAM STRUCTURE AND METHOD OF MAKING SUCH STRUCTURE

[75] Inventors: Rocco P. Triolo, Broomall; Richard A. Rossow, Wallingford; David J. Kelly, Chadds Ford, all of Pa.

[73] Assignee: Foamex L.P., Linwood, Pa.

[21] Appl. No.: 847,096

[22] Filed: May 1, 1997

Related U.S. Application Data

[63] Continuation-in-part of Ser. No. 500,009, Jul. 10, 1995, abandoned.

[51] Int. Cl.$^6$ .................. C08J 9/36; C08J 9/42; C08J 9/236
[52] U.S. Cl. .......... 521/54; 521/120; 521/122; 521/123; 521/137; 521/159
[58] Field of Search .............. 521/54, 120, 122, 521/123, 137, 159

[56] References Cited

U.S. PATENT DOCUMENTS

| | | | |
|---|---|---|---|
| 3,298,976 | 1/1967 | Reinhart | 521/123 |
| 3,401,128 | 9/1968 | Terry | 521/54 |
| 3,772,219 | 11/1973 | Schwarz | 521/123 |
| 3,894,973 | 7/1975 | Yunan | 161/170 |
| 4,014,826 | 3/1977 | Yunan | 521/54 |
| 4,082,703 | 4/1978 | Duffy et al. | 521/54 |
| 4,108,791 | 8/1978 | Wasilczyk | 521/122 |
| 4,185,146 | 1/1980 | Burke | 521/99 |
| 4,243,617 | 1/1981 | Burge | 264/39 |
| 4,243,625 | 1/1981 | Burge | 264/120 |
| 4,374,885 | 2/1983 | Ikeda et al. | 428/160 |
| 4,385,131 | 5/1983 | Fracalossi et al. | 521/55 |
| 4,438,220 | 3/1984 | Fracalossi et al. | 521/55 |
| 4,438,221 | 3/1984 | Fracalossi et al. | 521/55 |
| 4,443,286 | 4/1984 | Ikeda et al. | 156/245 |
| 4,683,246 | 7/1987 | Davis et al. | 521/54 |
| 4,839,393 | 6/1989 | Buchanan et al. | 521/53 |
| 5,096,623 | 3/1992 | Ward et al. | 521/54 |
| 5,114,981 | 5/1992 | Ward et al. | 521/55 |
| 5,175,194 | 12/1992 | Ward et al. | 521/55 |
| 5,204,040 | 4/1993 | Chang | 264/51 |
| 5,290,818 | 3/1994 | Nafziger et al. | 521/54 |
| 5,312,888 | 5/1994 | Nafziger et al. | 521/54 |
| 5,610,207 | 3/1997 | de Simone et al. | 521/54 |

*Primary Examiner*—Rabon Sergent
*Attorney, Agent, or Firm*—Connolly & Hutz

[57] ABSTRACT

Modified or filled rebond polyurethane foam structures having desired plushness and compression without adversely affected tensile strength at a given density as compared to unfilled rebond polyurethane foams are formed from an admixture of shredded or chopped polyurethane foam particles and a finely divided inorganic mineral filler, such as barium sulfate or calcium carbonate or mixtures of these and like mineral fillers, that is further mixed with a substantially non-foam forming liquid prepolymer binder. A portion of the polyurethane foam particles, from about 10 to about 60 parts by weight based upon 100 parts by weight, is replaced with filler. For each 100 parts by weight of the combined foam particles and filler, about 10 to about 30 parts by weight of prepolymer is added. After the wetted admixture is compressed to the required density, the prepolymer binder is cured with heat and/or steam. Surprisingly, the resultant filled rebond polyurethane foam structure is more plush and softer than unfilled rebond foam, and the filler is uniformly distributed throughout the cured binder and external to the foam cells of the foam particles.

14 Claims, No Drawings

MODIFIED REBOND POLYURETHANE FOAM STRUCTURE AND METHOD OF MAKING SUCH STRUCTURE

CROSS-REFERENCE TO RELATED APPLICATION

This application is a continuation-in-part of application Ser. No. 08/500,009, filed Jul. 10, 1995, now abandoned.

BACKGROUND OF THE INVENTION

Polyurethane foams are prepared by reacting, in the presence of a blowing agent, polyisocyanates with a high molecular weight polyol. Usually catalysts, such as organotin compounds and tertiary amines, and emulsifiers such as silicone oils are incorporated into the reaction mixture to control reaction rate, cell size and porosity.

In the prior art many efforts have been made to modify the properties of polyurethane foams and/or reduce the costs of producing such foams by adding various inert filler materials. For example, U.S. Pat. No. 3,298,976 discloses polyurethane foams prepared by adding the mineral filler barytes (e.g., barium sulfate) in finely divided form to the reaction mixture of the polyol and polyisocyanate and by using a lower amount of water. The mineral filler has an average particle size of 5 microns or greater and is added in an amount of from about 50 to 150 parts by weight based on 100 parts of the polyether polyol. The polyurethane foam is made either with a "one-shot" reaction method where the ingredients are reacted and simultaneously foamed, or in a "two-stage" method where the polyol is reacted with the polyisocyanate to form a partially reacted prepolymer, and subsequently an activator mixture (water and catalyst) is added to form the desired cellular polyurethane. The resultant filled virgin foams are stated to have good resilience and weight characteristics as compared to rubber latex foams.

Other filled virgin polyurethane foams are disclosed in U.S. Pat. No. 4,108,791. Such flexible polyurethane foams contain 0.1 to 5 percent by weight of an inorganic filler with particle sizes less than about 7 microns, including fumed silica, calcium carbonate, barium sulfate, aluminum silicate, kaolin, cadmium selenide, titanium dioxide, aluminum trihydrate, mica and iron oxide. The foams are stated to be readily molded without shrinkage. Further examples of filled virgin polyurethane foams are found in U.S. Pat. Nos. 4,452,920 and 3,598,772.

The present invention relates, however, to certain filled rebond polyurethane foams with desired foam density, plushness and other properties. Rebond polyurethane foam has been made in the prior art by shredding or grinding waste polyurethane foam to form polyurethane foam particles or chunks, mixing the polyurethane foam particles with a binder, placing the mixture into a mold, then curing the binder with steam.

Heretofore, when fabricating rebond foam it was generally possible to incorporate only relatively low amounts of solid materials into the rebond system to modify the rebond foam structure because the filler material would classify, agglomerate or settle out. As a result of the nonuniform distribution of large amounts of filler, the resultant rebond foam would have poor physical characteristics. One suggested method to incorporate more filler into a rebond foam product was to add the desired filler to the virgin foam, and then shred that virgin filled foam for use in the rebond product. U.S. Pat. No. 3,772,219 teaches a flexible polyurethane foam composition made by mixing 100 to 200 parts by weight of pulverulent limestone (calcium and magnesium carbonate) with 100 parts by weight polyether polyol and then mixing in the additional foam-forming reactants. The filled virgin foam so made can be shredded or chipped to smaller pieces and incorporated into a rebond foam. This method has limited utility because it is cost-prohibitive to make filled polyurethane foam solely for purposes of incorporating particles of that foam in a rebond product. Rather, rebond foam normally and preferably is formed with a broad range of scrap polyurethane foams.

The prior art does suggest that some fillers could be mixed with polyurethane foam chips before forming a new polyurethane foam structure with the chips and filler. For example, U.S. Pat. No. 4,438,221 discloses unique polyurethane foam-filled foams, in which a solid filler is mixed with shredded or ground polyurethane foam and this admixture is incorporated into the reaction product of a polyisocyanate and a reactive polyol. The '221 patent lists many possible fillers, including liquids and solids. Representative solids identified include graphite, carbon particles, metal filings, polymer powders, asbestos fibers, sawdust, pigments, soaps, detergents, beads, ground rubber, flame-retardant materials, but the patent only includes working examples in which solid flame-retardant materials were added as the solid material. In the '221 patent, the filler, shredded foam and reaction product are compressed in a mold through which steam is passed to foam the reaction product. A portion of the solid material (filler) penetrates into the foam chips, but the majority of the foam chips retain their original physical characteristics. The reaction product reacts with the water (steam) and forms a foam that adheres to the filler and the foam chips. For each 100 parts of pre-formed discrete polyurethane foam chips, there are from 40 to 200 parts of solid filler and 30 to 75 parts of reaction product or "new" foam binder. Unlike rebond foam structures in which a cured adhesive or binder coats some of the foam cell strands of the foam chips and holds the foam chips together, in the '221 patent, the foam chips are held together by a foam or foamed binder. In the '221 patent, the fillers are incorporated into and held within the foam particles of the newly formed foam (foamed reaction product). This filled foamed binder penetrates into the foam cell cavities of the scrap foam chips. In a sense cumulative to the patents teaching how to make filled virgin polyurethane foams, the '221 patent teaches how to disperse filler in a virgin polyurethane foam, which virgin foam is used to hold the other foam particles together to make the foam-filled foam structure. This patent does not show how to disperse fillers into a typical prepolymer binder for a rebond structure, a prepolymer binder that is cured with steam, but is not "foamed". This patent further does not show a rebond foam structure which has inert inorganic fillers uniformly distributed throughout the cured prepolymer binder (without either classifying or substantially penetrating into the foam chips) to improve the softness or plushness of the bonded foam at a given density.

Surprisingly, it has been found that certain inorganic mineral fillers, otherwise inert to the foam, such as barium sulfate, calcium carbonate, silica and talc, may be incorporated into a rebond polyurethane foam structure and uniformly distributed in the cured prepolymer binder of the rebond foam structure without penetrating into the foam strands of the foam particles. Such filled rebond polyurethane foam has an improved softness or plushness at a given density over unfilled rebond polyurethane foam.

SUMMARY OF THE INVENTION

A rebond polyurethane foam structure is obtained from the steps of (a) mixing a finely divided inorganic filler otherwise inert to polyurethane foams and liquid prepolymer binders, with particles of flexible polyurethane foam, and then (b) wetting the admixture of foam particles and filler with a liquid prepolymer binder based on the reaction product of a reactive polyol and a polyisocyanate. The foam, filler, binder mixture is thereafter compressed to obtain a desired product density and the binder is cured with heat and/or steam, but does not form a foam, to provide the filled rebond polyurethane foam structure. Surprisingly, the finely divided inorganic filler does not classify or agglomerate and is uniformly distributed in the cured binder and external to the cells of the foam particles of the rebond polyurethane foam structure. The binder coats the foam cell strands, but does not penetrate further into the foam cell cavities of the scrap foam particles.

In a preferred embodiment of the invention, the foam particles are chopped or shredded to particle sizes in the range of about one-quarter to one-half inch in diameter. The inorganic filler is barium sulfate, calcium carbonate or like mineral materials, or mixtures thereof, in commercially available ground particle sizes. The prepolymer binder is formed by reacting a liquid polyether or polyester polyol, or mixture of polyols, with an excess of isocyanate, or mixture of isocyanates, optionally in the presence of a catalyst. Polyols are generally categorized as polyether polyols or polyester polyols. Polyether polyols are conventionally oxides, such as ethylene oxide or propylene oxide, polymerized onto an active hydrogen compound such as ethylene glycol, propylene glycol, glycerol and so forth. Polyester polyols are conventionally polycondensation products of polyhydric acids, such as adipic acid, maleic acid or phathalic acid, with polyhydroxy compounds, such as ethylene glycol, propylene glycol, glycerol and so forth. A particularly preferred polyol would be a 3000 molecular weight polyether triol, such as VORANOL 3010 made by Dow Chemical. Suitable isocyanates include TDI (tolylene diisocyanate) or MDI (diphenylmethane diisocyanate), or PMDI (polymeric MDI or diphenylmethane diisocyanate containing methylene bisphenyl isocyanate and/or polymethylene polyphenyl isocyanate), or mixtures of TDI and MDI, or MDI and PMDI, or TDI and MDI and PMDI. A suitable polymeric MDI (PMDI) is LUPRINATE M20S from BASF Corp. A particularly preferred isocyanate would be VORANATE T-80 TDI made by Dow Chemical.

A portion of each 100 parts by weight of the polyurethane foam particles is replaced by from about 10 to 60 parts by weight of the inorganic filler, such that the combined filler and foam particles comprise 100 parts by weight. For each 100 parts by weight of combined foam particles and filler, about 10 to about 30 parts by weight of prepolymer binder is added. Preferably, for each 100 parts by weight of combined of polyurethane foam particles plus inorganic filler, the filler comprises about 20 to 50 parts by weight and the prepolymer binder comprises about 12 to 25 parts by weight. A particularly preferred filled rebond structure is obtained if the filler comprises about 30 parts by weight and the prepolymer binder comprises about 20 parts by weight for each 100 parts by weight of the combined polyurethane foam particles and inorganic filler. As the amount of filler to be incorporated into the filled rebond polyurethane foam structure is increased, the amount of liquid prepolymer binder is proportionately increased.

Forming the rebond polyurethane foam structure according to the invention has unexpected advantages over the prior art. Whether added in bulk or by sprinkling small amounts as the mixture is agitated, the filler is uniformly distributed throughout the cured binder in the filled polyurethane foam structure, without classifying, agglomerating or falling out. There is a uniform amount of filler within samples taken from the top, bottom and middle of the molded structure. The filler is inert to the binder and the polyurethane foam particles, and does not penetrate into the polyurethane foam strands, but is held within the cured binder. As compared to prior rebond polyurethane foam structures, the amount of polyurethane foam particles in the structure according to the invention may be reduced and replaced with inorganic filler, and the amount of prepolymer binder is increased. At a given product density, the plushness or softness of the resulting foam structure is increased over that obtained with an unfilled rebond polyurethane foam.

Contrary to the expected result, the addition of certain inorganic fillers, such as calcium carbonate, barium sulfate, silica or talc, or mixtures of these mineral fillers, does not increase, and actually decreases, the firmness or hardness of the rebond polyurethane foam structure. This leads to an increase in plushness or softness, which is a desired property for some rebond foam applications, such as carpet cushion. Depending upon the fillers selected and the amount of foam particles replaced by the fillers, filled rebond foam structures according to the invention also can have economic advantages over unfilled rebond foams.

The following examples are provided to illustrate the present invention, but are not to be construed as limiting the scope thereof in any manner.

EXAMPLES 1–7

The following reactants, polymer preparation procedures and physical testing methods are common to Examples 1–7.

A. Preparation of a Prepolymer Liquid Binder

For laboratory scale examples, the prepolymer liquid binder was formed as a reaction product of a polyol, an organic polyisocyanate and a catalyst.

For examples 1–7 reported in the Table, the liquid prepolymer will be referred to as either type A, B, C or D. For prepolymer binder A, 100 parts by weight of a 3010 polyol, a 3000 molecular weight polyether triol made by Dow Chemical was reacted with 37.4 parts by weight of tolylene diisocyanate (TDI), such as VORANATE T-80 made by Dow Chemical, and 0.1 parts by weight of a stannous octoate tin catalyst known as FOMREZ C-2 from Witco Corporation.

Prepolymer B was prepared by reacting 100 parts by weight of the 3010 polyol with 57.1 parts by weight of a mixture of MDI and PMDI, such as polymeric MDI PM199 from Dow Chemical, and 0.1 parts by weight of FOMREZ C-2 catalyst from Witco Corp.

Similarly, prepolymer C was the reaction product of 100 parts by weight of the 3010 polyol with 58.2 parts by weight of polymeric MDI sold under the designation LUPRINATE M20S (BASF Corp.) and 0.1 parts by weight of FOMREX C-2 catalyst from Witco Corp.

Prepolymer D was prepared by reacting 100 parts by weight of VORANOL 3512 polyol with the reaction product of 22.7 parts TDI and 52.9 parts PMDI (PM 199) and thereafter adding 31 parts extender oil (HYPRENE V-100).

B. Preparation of Filled Rebond Foam

For the laboratory-scale Examples reported in the Table (Examples 1–6), the bonded foam formulation was made according to the following procedure. After the prepolymer binder was prepared in a separate vessel, shredded flexible polyurethane foam particles with particle diameters in the range of from ¼ to ½ inch were added to a HOBART Mixer and mixed with the prepolymer binder. After the foam particles and prepolymer binder were mixed for about ten seconds, the inorganic filler was added to the mixer. For some examples, the inorganic filler was finely divided barium sulfate obtained from Mountain Minerals Co., Ltd. of Alberta, Canada. For other examples, the inorganic filler was ground calcium carbonate obtained from Delta Carbonate, Inc. Other suitable mineral fillers that might be added to the modified rebond foam structure either separately or mixed with the calcium carbonate or barium sulfate are crystalline silica, such as SIL-CO-SIL 250 offered by U.S. Silica or VERTAL 92 (talcos ore) offered by Luzenac America. After these rebond foam formulation ingredients were thoroughly mixed together in the mixer for another ten minutes, the mixture was poured into a cylindrical mold with a diameter of seven inches and height of four inches. The molded formulation was compressed to achieve a desired product density. A common foam density for carpet cushion is about six pounds per cubic foot, but other foam densities may also be produced. Finally, water in an amount of about 10 parts by weight, based on the 100 parts of filler and foam particles was added to the mold. For the laboratory mixes, the water also contained about 0.07 parts by weight, based on 100 parts by weight of the combined foam particles and filler, of a catalyst sold under the trade designation DABCO 33LV.

While the formulation was held under compression in the mold, the liquid prepolymer binder was cured by heating the mold until the water formed steam. Once the binder has cured, the molded rebond product was removed from the mold and allowed to dry for one hour.

An unfilled rebond polyurethane foam structure was made in a similar manner as a control, using the same type of polyurethane foam particles and liquid prepolymer binder A. For the unfilled rebond foam, however, 100 parts by weight of polyurethane foam particles were admixed with the liquid prepolymer binder without the addition of any filler material.

Although specific polyols, polyisocyanates and catalysts were used in the examples, others known to those of skill in the art would be suitable in this invention.

The invention was also carried out on a production scale. The preparation of the modified rebond foam in production is similar to that of the laboratory, except that the inorganic filler was first mixed with the shredded foam particles and then the prepolymer binder was added to this mixture. In addition, the batch size and equipment are larger. For Example 7 reported in the Table, 434 pounds of polyurethane scrap foam was mixed with 186 pounds of calcium carbonate (YS-35 from Delta Carbonate, Inc.). 124 pounds of prepolymer D were then added to the foam and filler mixture. The wetted mixture was then introduced into a six foot long cylindrical mold with a diameter of 5 feet and cured with steam. For the production scale example, no catalyst was added to the prepolymer binder or to the steam. In addition, steam was directly introduced to the system to cure the binder, whereas for the lab samples water was added in situ and the entire batch was heated to form the steam and cure the binder.

C. Tests Conducted on Filled Rebond Foams

The compression force deflection test (CFD) is a measure of the force necessary to produce a certain percentage of compression over the entire top area of a foam specimen. CFD was measured for samples of the filled rebond foams following the procedure set out in ASTM Standard D3574-91, however, units were measured in pounds per square inch (psi). The CFD is one factor related to the softness or plushness of the foam.

The ash test provides a measure of the distribution of fillers within a material such as rubber or plastic. Multiple ash tests can show the amount of filler present in different locations within a product specimen. Data from the tests shows the distribution of the filler throughout the product. Specimens were taken from the top, middle and bottom of the filled rebond polyurethane foam product. Following the procedure set out in ASTM Standard D297, the specimens were ignited and burned under high heat. All resulting residue matter left (ash) was recovered and the percentage of recovered ash was calculated. Often the residue is the inorganic material present in the foam product known as filler. If the percent ash from many different locations within the product corresponds with the percent filler added to the formulation (the expected or theoretical percent ash), then the filler was substantially uniformly distributed throughout the product.

An ash test was performed on the rebond foam structure of Example 7 (See Table I below), the production scale foam structure formed into a log that was six feet long and five feet in diameter. For the foam of this Example, the filler was substantially uniformly distributed throughout the structure. The percentage of ash for the specimen taken from the top, middle and bottom of the foam product from this Example was 24.10%, 24.04%, 23.96%, respectively (average 24.03%). These percentages were about 25%, and the product formulation for this Example incorporated about 25% filler.

TABLE I

Modified Rebond Polyurethane Foam Structures

| Example[7] | 1 Control | 2 | 3 | 4 | 5 | 6 | 7 |
|---|---|---|---|---|---|---|---|
| Foam particles | 100[5] | 70 | 70 | 70 | 70 | 50 | 70 |
| Filler | 0 | 30[2] | 30[2] | 30[3] | 30[2] | 50[2] | 30[4] |
| Prepolymer[1] | 10 (A) | 20 (A) | 20 (B) | 20 (A) | 20 (C) | 30 (A) | 20 (D) |
| Water | 10 | 10 | 10 | 10 | 10 | 10 | |
| Catalyst | 0.07 | 0.07 | 0.07 | 0.07 | 0.07 | 0.07 | |
| Density (lbs/ft$^3$) | 5.75 | 5.94 | 5.86 | 5.89 | 6.13 | 5.88 | 6.14 |
| Thickness (inch) | 0.5 | 0.5 | 0.5 | 0.5 | 0.5 | 0.5 | 0.5 |
| CFD at 25% (psi)[8] | 1.69 | 1.15 | 1.42 | 1.21 | 1.64 | 1.06 | 1.03 |
| CFD at 50% (psi) | 3.33 | 2.21 | 3.02 | 2.49 | 3.22 | — | — |
| CFD at 65% (psi) | 6.73 | —[6] | 6.43 | 5.33 | 5.97 | 4.43 | 5.24 |

TABLE I-continued

Modified Rebond Polyurethane Foam Structures

| Example[7] | 1 Control | 2 | 3 | 4 | 5 | 6 | 7 |
| --- | --- | --- | --- | --- | --- | --- | --- |

[1]Prepolymers used in examples in Table I are identified as A, B, C and D as defined in the specification.
[2]Barium sulfate, commercially available from Mountain Minerals Co., Ltd. of Alberta, Canada.
[3]C-50 calcium carbonate, commercially available from Delta Carbonate, Inc.
[4]YS-34 calcium carbonate, commercially available from Delta Carbonate, Inc.
[5]All amounts for foam particles, filler, prepolymer and other ingredients are given in parts by weight.
[6]"—" indicates that the test was not performed on the sample.
[7]Examples 1–6 were prepared in a laboratory and Example 7 was prepared in a production plant.
[8]CFD values were measured for samples with sizes of approximately ½ × 2 × 2".

EXAMPLES 8 and 9

Samples were prepared according to Example 1 of U.S. Pat. No. 4,438,221 (Fracalossi) (Example 9 below) and according to the invention herein (Example 8) to compare the resulting foam structures obtained.

For Example 8:
Prepolymer Binder A
   100 parts by weight of VORANOL 3010, a 3000 Molecular weignt polyether triol was reacted with 37.4 parts by weight of TD80, tolylene diisocyanate, and 0.10 parts by weight of FOMREZ C-2, stannous octoate catalyst.
Bonded composition
   35 parts by weight of Prepolymer Binder A were mixed with 122.5 parts by weight of polyurethane foam particles and 52.5 parts by weight of ground calcium carbonate.
The binder/filler/foam mixture was then compressed into a mold to achieve a density of 5.6 pounds per cubic foot. A water and amine catalyst mixture (17.5 parts by weight water and 0.12 parts by weight DABCO 33LV catalyst) was poured into the mold with the binder/filler/foam mixture. The mold was placed in an oven at 110° C. for 45 minutes to cure the binder. Thereafter, the sample was removed from the mold and inspected under a microscope at magnifications 20× and 50× to observe the resulting foam cell structure.

For Example 9:
Foaming Binder
   The binder according to Example 1 of Fracalossi was prepared with 27.4 parts by weight of VORANOL 3010, a 3000 Molecular weight polyether triol and 13.1 parts by weight of TD80, tolylene diisocyanate, for a combined total of 40.5 parts by weight, and with 0.10 parts by weight of FOMREZ C-2, stannous octoate catalyst, 1.0 parts by weight of L620, an organosilicone surfactant, 1.0 parts by weight of N-ethyl morpholine, an amine catalyst, and 5.0 parts by weight of methylene chloride, a solvent.
Bonded composition
   47.6 parts by weight of the Foaming Binder were mixed with 100 parts by weight of polyurethane foam particles and 97.1 parts by weight of alumina hydrate. 15.1 parts by weight of DE60F, a pentabromodiphyl oxide from Great Lakes, were added to the composition in lieu of the decabromodiphyloxide, which was not available when the Examples were prepared. 20.7 parts by weight of AB100, a chlorinated phosphate ester from Albright & Wilson, was used in lieu of the obsolete THERMOLIN 100 set out in Fracalossi Example 1. Ethylene maleic anhydride copolymer, an inert fire retardant and char former, was omitted due to unavailability.

The binder/filler/foam mixture was then compressed into a mold to achieve a density of 5.6 pounds per cubic foot. 17.5 parts by weight water were poured into the mold with the binder/filler/foam mixture. The mold was placed in an oven at 110° C. for 45 minutes to foam the foaming binder. Thereafter the sample was removed from the mold and inspected under a microscope at magnifications 20× and 50× to observe the resulting foam cell structure.

The foam cell structure obtained in Example 9 (Fracalossi—foam-in-foam) shows new foam cells (containing the filler) formed within the foam cells of the foam scrap particles (i.e., within the strut structure of the cells), whereas the foam cell structure obtained in Example 8 does not. With the rebond foam structure according the invention, the filler is distributed in the cured binder, and the binder attaches to or coats only the struts of the foam cells and remains outside the cell cavities of the foam cells of the foam particles.

Various modifications will be apparent to those skilled in the art without departing from the scope and spirit of this invention. Accordingly, the scope of the claims that follow are not to be limited by the examples set forth above. The claims should be construed as encompassing in the invention all features which would be treated as equivalents by those of skill in the art to which the invention pertains.

We claim:

1. A rebond polyurethane foam structure obtained from the steps of:
   (a) mixing from about 10 to 60 parts by weight of an inorganic filler selected from the group consisting of: calcium carbonate, barium sulfate, silica, talc, and mixtures of such fillers, with from about 90 to 40 parts by weight of particles of flexible polyurethane foam, such that the combined mixture of foam particles and inorganic filler totals 100 parts by weight, wherein the inorganic filler is inert to both the polyurethane foam and to a reactive but non-foam-forming liquid prepolymer binder made from a reactive polyol and a reactive polyisocyanate;
   (b) wetting the admixture of (a) with from about 10 to about 30 parts by weight, based on 100 parts by weight of the combined foam particles and filler of the reactive non-foam forming liquid prepolymer binder;
   (c) compressing the wetted admixture; and
   (d) curing the binder with steam to provide a rebond polyurethane foam structure with the inorganic filler uniformly distributed in the cured binder and external to the foam cells of the foam particles.

2. The rebond polyurethane foam structure of claim 1, wherein the structure is formed with from about 20 to 50 parts by weight of the filler, from about 80 to 50 parts by weight of the foam particles, and from about 12 to 25 parts by weight of the prepolymer binder.

3. The rebond polyurethane foam structure of claim 2, wherein the structure is formed with from about 30 parts by weight of the filler and from about 70 parts by weight of the foam particles, and from about 20 parts by weight of the prepolymer binder.

4. The rebond polyurethane foam structure of claim 1, wherein the inorganic filler is calcium carbonate.

5. The rebond polyurethane foam structure of claim 1, wherein the inorganic filler is barium sulfate.

6. The rebond polyurethane foam structure of claim 1, wherein water is added to the the wetted admixture prior to curing.

7. The rebond polyurethane foam structure of claim 1, wherein additives selected from the group consisting of: catalysts and extender oils, and mixtures thereof, are added to the prepolymer binder.

8. A method of forming a rebond polyurethane foam structure, comprising the steps of:

(a) mixing together from about 90 to 40 parts by weight of polyurethane foam particles with from about 10 to 60 parts by weight of an inorganic filler selected from the group consisting of: calcium carbonate, barium sulfate, silica, talc, and mixtures of such fillers, such that the combined foam particles and inorganic filler totals 100 parts by weight, wherein the inorganic filler is inert to both the polyurethane foam particles and to a non-foam forming reactive prepolymer binder made from a reactive polyol and a reactive polyisocyanate;

(b) wetting the admixture of (a) with about 10 to 30 parts by weight, based on 100 parts by weight of the combined foam particles and inorganic filler, of a non-foam forming reactive prepolymer binder made from a reactive polyol and a reactive polyisocyanate;

(c) compressing the wetted admixture; and (d) curing the binder with steam to provide a rebond polyurethane foam structure with the inorganic filler uniformly distributed in the cured binder and external to the foam cells of the foam particles.

9. The method of claim 8, wherein from about 20 to 50 parts by weight of the filler and from about 80 to 50 parts by weight of the foam particles are mixed together, and the mixture is wetted with from about 12 to 25 parts by weight of the prepolymer binder, based on 100 parts by weight of the combined foam particles and inorganic filler.

10. The method of claim 9, wherein from about 30 parts by weight of the filler and from about 70 parts by weight of the foam particles are mixed together, and the mixture is wetted with from about 20 parts by weight of the prepolymer binder, based on 100 parts by weight of the combined foam particles and inorganic filler.

11. The method of claim 8, wherein the inorganic filler is calcium carbonate.

12. The method of claim 8, wherein the inorganic filler is barium sulfate.

13. The method of claim 8, wherein water is added to the the wetted admixture prior to curing.

14. The method of claim 8, wherein additives selected from the group consisting of: catalysts and extender oils, and mixtures thereof, are added to the prepolymer binder.

* * * * *